Dec. 29, 1931.  J. D. HAALMEIJÉR ET AL  1,839,096
BRAKE FOR AUTOMOTIVE VEHICLES
Filed March 9, 1929
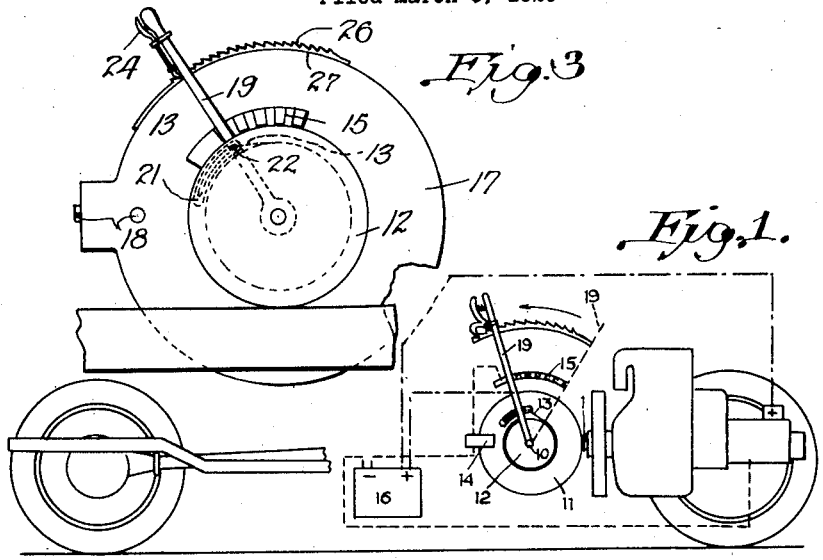
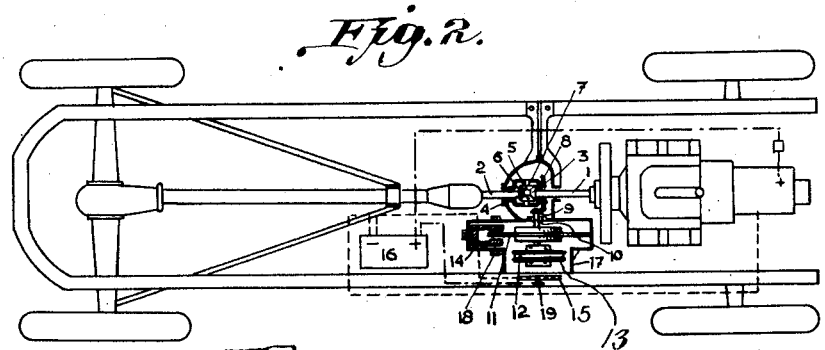
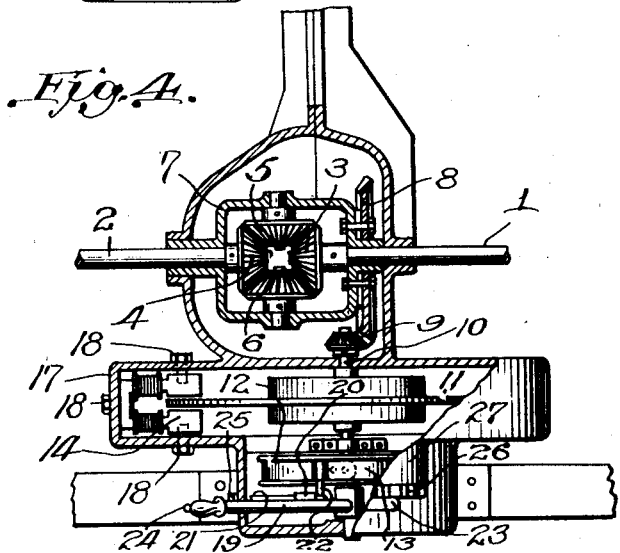
INVENTORS
J. D. Haalmeijer
W. W. Haalmeijer
W. J. van de Reijden
BY
Munn & Co.
ATTORNEYS Patented Dec. 29, 1931

1,839,096

UNITED STATES PATENT OFFICE

JAN DANIËL HAALMEIJĔR, OF LEIDEN, WILLEM WYBRANDT HAALMEIJĔR, OF AMSTERDAM, AND WILLEM JACOBUS VAN DE REIJDEN, OF LEIDEN, NETHERLANDS, ASSIGNORS TO NAAMLOOZE VENNOOTSCHAP INTERNATIONALE HANDELSVEREENIGING, OF AMSTERDAM, NETHERLANDS

BRAKE FOR AUTOMOTIVE VEHICLES

Application filed March 9, 1929, Serial No. 345,750, and in Germany January 26, 1929.

The invention relates to a variable speed drive for automobile vehicles, and consists more particularly in a transmission system in which the change of speed is effected rapidly and continuously, instead of step by step, without unclutching the engine, so that no friction or other clutch is required for the connection between the engine and the change speed gear.

According to the invention, the primary or driving shaft is coupled with the secondary or Cardan shaft by a differential gear, the casing of which is acted on by a brake system energized by an adjustable electric current.

The casing of the differential gear according to the invention may for this purpose be in operative connection with an electrically conducting disc adapted to be braked electrodynamically, and a mechanical braking device is also provided in order to bring the disc to rest. Preferably, the lever of a control device, inserted in the circuit of the electro-dynamic brake apparatus, is adjusted in conjunction with the mechanical brake, so that the electro-dynamic and the mechanical braking apparatus are actuated in succession in the process of changing speed.

The accompanying drawings illustrate an example of a transmission apparatus according to the invention.

Fig. 1 is diagrammatic side elevation of the device installed upon a vehicle,

Fig. 2 a plan thereof.

Figure 3 is an enlarged detail view illustrating the control lever and associated parts.

Figure 4 is an enlarged top plan view of the device, with portions of the casing cut away.

The primary or engine shaft 1 is connected, without the insertion of a clutch, with the Cardan or secondary shaft 2 by a differential gear which consists of bevel wheels 3, 4, respectively keyed on the shafts 1 and 2, and bevel wheels 5, 6, the wheels 5 and 6 being loosely mounted in known manner in a casing 7. The casing 7 is freely rotatable about the shafts 1 and 2 and carries a bevel wheel 8 which engages with a bevel pinion 9. The latter is secured on a shaft 10, on which a metal disc 11, preferably of brass, is fastened.

The shaft 10 also carries a brake disc 12 around which is a brake band 13 (Fig. 1) covered with friction material. The periphery of the disc 11 rotates between the poles of an electromagnet 14 which is inserted in a circuit containing a regulating resistance 15 and a source of current 16, preferably a storage battery. The magnet and disc is surrounded by a casing 17 of aluminum to which the magnet 14 is fastened, for example by three copper bolts 18. The casing 17 is preferably provided with ventilating apertures.

The lever 19 regulating the resistance 15 is also connected with the brake band 13, so that the resistance is inserted or cut out and the brake band released or tightened in succession in the same control operation.

The action of the transmission apparatus is as follows:—When the vehicle is at rest, the lever 19 is in the position shown by the broken lines, in which all the resistance is inserted or the magnet 14 is de-energized and the brake band is free. When the engine is started, the bevel wheel 3 rotates at the same number of revolutions as the crank shaft and the large bevel wheel 8 rotates at half the speed of revolution of the wheel 3, since the vehicle and also the bevel wheel 4 are stationary. The small bevel wheels 5 and 6 roll, consequently, on the stationary bevel wheel 4. The movement of rotation of the bevel wheel 8 is transmitted by the bevel pinion 9 to the shaft 10, so that the disc 11 rotates at high speed.

If the lever 19 is displaced in the direction of the arrow, the resistance in the current circuit is gradually cut out, so that the field of the electromagnet 14 is gradually increased and by the eddy currents induced exerts a correspondingly increasing brake action on the disc 11.

The rotation of the casing of the differential gear is, therefore, opposed by a continually increasing force, so that the drive is transmitted in a corresponding ratio with increasing intensity to the Cardan shaft and the vehicle is driven at a higher speed. When the lever 19 leaves the last contact, by further movement in the same direction, the band 13 is drawn tightly about the brake disc, so that the casing of the differential gear is brought to rest and the engine shaft is directly coupled with the Cardan shaft and the full speed of the engine is transmitted to this shaft. If the lever 19 is moved in the opposite direction, the brake disc and, therefore, the casing 7 are released and there is a gradual reduction of the brake action, so that the speed of the vehicle decreases. The disc 11 can be provided with shrouds or ribs cooled by the currents of air drawn through the ventilating openings of the casing 17 for the purpose of carrying away the heat developed by the Foucault currents.

The change of speed can be effected very rapidly without shock, and the engine need not be unclutched and can rotate at its full speed. The required speed can be controlled by the supply of fuel.

The apparatus according to the invention can be used with automobiles having the steering gear either on the right or left hand sides.

What we claim is:

1. A brake for use in automobiles and the like, comprising an electrically conducting rotatable member adapted for operative engagement with a movable member of the running gear of the said automobile, an electromagnet having its poles on opposite sides of the plane of rotation of said rotatable member, a resistance in the circuit of said electromagnet, a lever carrying a contact for engagement with said resistance to vary the same, a friction member rotatable with the electric conducting rotatable member and a second friction member adapted for actuation by said lever to engage said rotatable friction member.

2. A brake for controlling the speed of automobiles and the like, comprising an electric conducting rotatable member connected to a movable member of the operating gear of said automobile, a U-shaped electro-magnet having its poles on opposite sides of the plane of rotation of said rotatable member, means for varying the energization of said electro-magnet to control the rotation of said rotatable member, a mechanical brake to further control the movements of said rotatable member and unitary means for varying the energization of the electro-magnet and for actuating said mechanical brake.

In testimony whereof we affix our signatures.

JAN DANIËL HAALMEIJER.
WILLEM WYBRANDT HAALMEIJER.
WILLEM JACOBUS van de REIJDEN.